United States Patent Office 2,714,601
Patented Aug. 2, 1955

2,714,601

ALPHA-CHLORINATION OF 3-KETOSTEROIDS

Gunther S. Fonken, Kalamazoo, Robert H. Levin, Kalamazoo Township, Kalamazoo County, and A Vern McIntosh, Jr., Kalamazoo, Mich., assignors to The Upjohn Company, Kalamazoo, Mich., a corporation of Michigan No Drawing. Application July 16, 1952,
Serial No. 299,234

20 Claims. (Cl. 260—397.45)

This invention relates to an industrially important chemical process for the chlorination of chemical compounds and is more particularly concerned with a novel process for the α-chlorination of ketosteroids using an organic hypochlorite, especially the 4-chlorination of 3-ketosteroids using an alkyl hypochlorite.

It is an object of the present invention to provide a novel process for the α-chlorination of ketosteroids. A further object is the provision of a process for the 4-chlorination of 3-ketosteroids to produce 4-chloro-3-ketosteroids in high yields. Other objects of this invention will be apparent to those skilled in the art to which this invention pertains.

4-chloro-3-ketosteroids are valuable precursors to physiologically active steroids. 17α-hydroxy-21-acetoxy-pregnane-3,11,20-trione, for example, can be chlorinated to give 4-chloro-17α-hydroxy-21-acetoxypregnane-3,11,20-trione, which can thereafter be dehydrohalogenated by procedure well-known in the art, to produce cortisone acetate. Moreover, 4-chloro-3-ketosteroids have been found to be very stable compounds and can be kept for long periods of time without noticeable decomposition. Since most physiologically active hormone and hormone-like steroids possess a Δ4-3-keto group, a process which produces a 3-keto-4-chloro group, without extensive manipulation or the necessity of carefully controlled conditions, is of considerable industrial importance. A further advantage of the process of the present invention resides in the fact that the chlorination is achieved without the use of chlorine gas, the prior art use of which was sufficiently inconvenient and unsatisfactory to reduce interest in the chlorination of steroids to a minimum. Moreover, the process of the present invention is conveniently performed at about room temperature, e. g., between about twenty and about thirty degrees centigrade, usually without external heating or cooling, thus adding to the convenience, simplicity, and economy of the process.

The process of the present invention, besides being a simple, economical, and convenient method of converting a ketosteroid to an α-chloroketosteroid, and especially a 3-ketosteroid to a 4-chloro-3-ketosteroid, is particularly advantageous in that yields of desired product are frequently nearly the theoretical amount, as illustrated by Example 1. The product thus obtained is sufficiently pure for most purposes and usually does not require purification. Other uses and advantages of this industrially significant invention will be apparent to those skilled in the art to which this invention pertains.

Preferred starting compounds of the present invention are 3-ketosteroids having the normal configuration at the 5-carbon atom, which are unsubstituted at the 4-position, which are saturated (i. e., carbon to carbon double and triple-bonds are not present), and which do not have unsubstituted primary or secondary-hydroxyl groups, since these unsaturated linkages and hydroxyl groups, which also usually react with organic hypochlorites, sometimes unduly complicate the reaction. Steroids of the above type, but containing in addition, an 11α (or β)-hydroxyl group, are also included as preferred starting compounds since the 11α-hydroxyl group usually is unaffected by alkyl hypochlorites, and the 11β-hydroxyl group is converted to an 11-keto group by using one additional molar equivalent of the alkyl hypochlorite. This delineation of preferred starting compounds, however, is not to be construed as limiting the scope of this invention. Numerous other ketosteroids are converted to α-chloroketosteroids by the process of this invention and are also included as starting materials within the scope of this invention. If additional groups such as, for example, unsaturated linkages or other hydroxyl groups, or other groupings, are present which are reactive with the alkyl hypochlorite under the conditions of the reaction, an additional amount of the organic hypochlorite may be included in the reaction mixture to react with these additional groups. Alternatively these additional reactive groups in the starting compounds may be protected and later regenerated in the product obtained by the process of the present invention, for example, carbon to carbon double-bonds may be protected by adding two bromine atoms and later regenerated by treating with zinc. Additional hydroxyl groups may be protected, for example, by selective ester or ether formation and later regenerated by hydrolysis. In some instances chlorination of a 3-ketosteroid occurs at a position other than the 4-position, e. g., at the 2-position when a 3-ketoallosteroid is employed as starting material.

Preferred starting normal 3-ketosteroids of particular interest are those having the following structural formula:

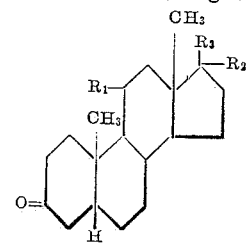

wherein $R_1$ is hydrogen, α-hydroxy or an acyloxy ester thereof, such as, for example, formyloxy, acetoxy, benzoyloxy, propionoxy, butyryloxy, valeryloxy, hexanoyloxy, phenylacetoxy, octanoyloxy, or the like, especially lower-alkanoyloxy, or β-hydroxy, or ketonic oxygen; $R_2$ is hydrogen or hydroxy; and $R_3$ is acetyl, acyloxyacetyl, e. g., acetoxyacetyl, propionoxyacetyl, butyryloxyacetyl, octanoyloxyacetyl, benzolyloxyacetyl, or the like, especially acyloxyacetyl wherein the acyloxy group is a lower-alkanoyloxy group, or haloacetyl, e. g., bromoacetyl, chloroacetyl, or the like.

According to the method of the present invention a ketosteroid, especially a 3-ketosteroid, is contacted, in the presence of water, with an organic hypochlorite, preferably an alkyl hypochlorite.

In carrying out the process of the present invention, the starting ketosteroid is contacted, in the presence of from a trace to about twenty per cent of water based upon the total weight of the reaction mixture, with an organic hypochlorite, preferably an alkyl hypochlorite. The reaction is usually conducted in the presence of an organic solvent such as, for example, tertiary-butyl alcohol, tertiary-amyl alcohol, chloroform, ethylene dichloride, or the like, the concept, definition, and use of a solvent being well-known in the art. The temperature employed is usually between about minus ten and about plus fifty degrees centigrated, ordinarily about room temperature, e. g., between about twenty and about thirty degrees centigrade, for a reaction period of between about ten minutes and about twenty-four hours, the exact time required for complete reaction being in part dependent upon the reaction temperature and the particular hypochlorite and solvent employed, as well as other factors apparent to one skilled in the art.

Although the use of organic hypochlorites generally is within the purview of the present invention, alkyl hypochlorites are usually used. The secondary-alkyl hypochlorites, however, are relatively unstable and for this reason are not the preferred hypochlorites. Since methyl hypochlorite is extremely unstable and even explosive in certain instances, it is preferably not employed in carrying out the process of the present invention. The tertiary-alkyl hypochlorites have been found to be particularly satisfactory organic hypochlorites, being quite stable, and of these, tertiary-butyl hypochlorite has been used with repeated success and is therefore a preferred alkyl hypochlorite. Best yields of 4-chloro-3-ketosteroids appear to be obtained when the alkyl hypochlorite is employed in the molar ratio to starting 3-ketosteroid of at least about one to one, preferably from about 1.2 to about 1.5 moles of alkyl hypochlorite to one mole of starting steroid. Large molar excesses of alkyl hypochlorite do not appear to be advantageous and may even be disadvantageous in certain instances. However, if an additional group which reacts with the alkyl hypochlorite is present, the amount of alkyl hypochlorite can be increased by the amount required to react with the additional group.

While considerably broader ranges of reaction temperature, e. g., between about minus ten and about plus fifty degrees centigrade, are included within the scope of the present invention, the preferred reaction temperature is at or about room temperature, e. g., between about twenty and about thirty degrees centigrade, as high yields of desired product are obtained at this temperature and external cooling or heating is usually unnecessary. Sometimes, however, a reaction temperature slightly below room temperature will enhance the yield of desired product when the reaction is unduly accompanied by undesirable side reactions. Usually reaction temperatures substantially above room temperature are not preferred. In general the preferred reaction temperature, while usually room temperature, varies somewhat with the starting steroid and the alkyl hypochlorite employed. Temperatures substantially below minus ten and substantially above plus fifty degrees centigrade are operative in certain instances.

Tertiary alkanols have been found to be excellent reaction solvents and tertiary-butyl alcohol, a preferred solvent, has been used with repeated success. Other solvents such as, for example, tertiary-amyl alcohol, chloroform, ethylene dichloride, pentane, hexane, and the like, are also suitable. The choice of reaction solvent depends in part on the solubility of the starting steroid in the solvent.

Water is usually present in the reaction mixture in carrying out the process of the present invention. The amount of water present in the reaction mixture is usually up to about twenty per cent of the total reaction mixture by weight. When no water is present, the rate of reaction is slow and yields of desired product are less than optimum, and when more than twenty per cent water, based on the total reaction weight is employed, the reaction is usually sluggish and requires long periods of time for completion of the reaction. Usually about two to about six per cent water gives the best yields of product.

It has also been found that the addition of a strong acid such as, for example, hydrochloric, sulfuric, benzenesulfonic, para-toluenesulfonic acid, or the like, and particularly hydrochloric acid, to the reaction mixture increases the rate of reaction and enhances the yield of desired product, and preferred operating conditions include the addition to the reaction mixture of from about 0.5 mole to about five moles of hydrogen chloride per mole of steroid. The reaction can be carried out in the presence or absence of light.

Isolation of the desired product of the reaction is conveniently achieved, for example, by distilling the volatile components of the reaction mixture at reduced pressure, leaving the steroid product as the distillation residue. Frequently, especially when using tertiary-butyl alcohol as reaction solvent, the desired reaction product crystallizes from the reaction mixture in a state of high purity and does not require further purification. Alternatively the product may be allowed to crystallize from the reaction mixture, additional amounts of product being obtained by concentration of the filtrate or dilution of the filtrate with water. Purification of the reaction product can be achieved, however, if desired, by crystallization from a solvent such as, for example, methanol, ethanol, ether, chloroform, methylene dichloride, or the like, or by adsorption and elution on a chromatographic column according to methods well-known in the art.

The progress of the chlorination can conveniently be followed by iodometric titration, according to methods known in the art, of aliquot samples taken from time to time from the reaction mixture. When consumption of alkyl hypochlorite has essentially ceased or when the theoretical amount has been consumed, the reaction is usually complete and further reaction time is unnecessary.

The following examples are illustrative of the process and products of the present invention, but are not to be construed as limiting.

*Example 1.—4-chloro-17α-hydroxy-21-acetoxypregnane-3,11,20-trione*

A solution containing two grams of 17α-hydroxy-21-acetoxypregnane-3,11,20-trione [Sarett, J. Am. Chem. Soc., 71, 2443 (1949)], three milliliters of water, 0.8 milliliter of concentrated hydrochloric acid, 1.13 milliliters of tertiary-butyl hypochlorite, and sufficient tertiary-butyl alcohol to give a total volume of 100 milliliters is prepared and stirred at about thirty degrees centigrade for nineteen hours. Distillation of the volatile components of the reaction mixture gives a nearly quantitative yield of solid residue which is identical with the 4-chloro-17α-hydroxy - 21- acetoxypregnane - 3,11,20 - trione obtained in Example 2. Dehydrohalogenation of the product using collidine gives cortisone acetate.

*Example 2.—4-chloro-17α-hydroxy-21-acetoxypregnane-3,11,20-trione*

In exactly the same manner as in Example 1, two grams of 17α - hydroxy - 21 - acetoxypregnane - 3,11,20 - trione is treated with the same amount of the same reactants. The product which precipitates from solution is removed by filtration; weight 1.14 grams; melting point 240–243 degrees centigrade; $[\alpha]_D^{23}$ plus 102 degrees in acetone. Dilution of the filtrate with water gives a second crop of crystals weighing 0.42 gram. Distillation of the solvents from the resulting residual filtrate gives the remainder of the 4 - chloro - 17α - hydroxy - 21 - acetoxypregnane-3,11,20-trione as a solid residue; weight about 0.4 gram. The total yield is above 95 per cent of the theoretical amount.

In the same manner as shown in Example 1 and Example 2 other 4-chloro-17α-hydroxy-21-acyloxypregnane-3,11,20-triones are prepared from the corresponding 17α-hydroxy - 21 - acyloxypregnane - 3,11,20 - triones, including 4 - chloro - 17α - hydroxy - 21 - formyloxypregnane-3,11,20 trione; 4 - chloro - 17α - hydroxy - 21 - propionoxypregnane - 3,11,20 - trione; 4 - chloro - 17α-hydroxy - 21 - valeryloxypregnane - 3,11,20 - trione; 4-chloro - 17α - hydroxy - 21 - octanoyloxypregnane-3,11,20-trione; 4 - chloro - 17α - hydroxy - 21 - benzoyloxypregnane-3,11,20-trione; and the like.

*Example 3.—4-chloro-17α-hydroxypregnane-3,11,20-trione*

A suspension of 28.07 grams of 17α-hydroxypregnane-3,11,20-trione [Kritchevsky, et al., J. Am. Chem. Soc., 74, 483 (1952)] in 510 milliliters of tertiary-butyl alcohol is treated successively with 16.8 milliliters of water, eleven milliliters of tertiary-butyl hypochlorite and ten milliliters of concentrated hydrochloric acid. The resulting mixture is stirred in the absence of light at about twelve degrees centigrade for about 21 hours, the active halogen being completely consumed at the end of this period as determined by iodometric titration of an aliquot sample. The mixture is then diluted with water to a volume of about two liters and the diluted mixture is cooled in an ice bath. The 4-chloro-17α-hydroxypregnane-3,11,20-trione which precipitates is recovered by filtration; yield 27.49 grams or ninety per cent of the theoretical amount when the weight is corrected for the aliquot samples removed during the reaction; melting point 220–229 degrees centigrade; $[\alpha]_D^{23}$ plus 89 degrees in acetone. Recrystallization of the product from aqueous acetone to obtain a highly purified product without regard to loss of material gave 20.63 grams of 4-chloro-17α-hydroxypregnane-3,11,20-trione; melting point 234–238 degrees centigrade; $[\alpha]_D^{23}$ plus 96 degrees in acetone.

*Analysis.*—Calculated for $C_{21}H_{29}O_4Cl$: Cl, 9.31. Found: Cl, 9.34.

*Example 4.—4-chloro-17α-hydroxypregnane-3,11,20-trione*

In exactly the same manner as in Example 3, 1.4 grams of 17α-hydroxypregnane-3,11,20-trione is treated with 0.57 milliliter of tertiary-amyl hypochlorite instead of tertiary-butyl hypochlorite. After the reaction is complete, distillation of the volatile components of the reaction mixture leaves as distillation residue nearly the theoretical amount of 4-chloro-17α-hydroxypregnane-3,11,20-trione, identical with the product of Example 3; melting point 221–230 degrees centigrade. The product is very stable and may be stored for a long period of time without noticeable decomposition. Treatment of 4-chloro-17α-hydroxypregnane-3,11,20-trione with semicarbazide hydrochloride followed by pyruvic acid is productive of the known 17α-hydroxy-4-pregnene-3,11,20-trione. Treatment of 4-chloro-17α-hydroxypregnane-3,11,20-trione with bromine in acetic acid gives 4-chloro-17α-hydroxy-21-bromopregnane-3,11,20-trione, identical with the product of Example 5, which on dehydrohalogenation with semicarbazide hydrochloride followed by pyruvic acid, and replacement of the 21-bromine atom by acetate using potassium acetate in acetone, gives cortisone acetate.

*Example 5.—4-chloro-17α-hydroxy-21-bromopregnane-3,11,20-trione*

17α-hydroxy-21-bromopregnane-3,11,20-trione [Kritchevsky et al., J. Am. Chem. Soc., 74, 484 (1952)] is treated with tertiary-butyl hypochlorite according to the procedure of Example 1. Distillation of the volatile components of the reaction mixture after completion of the reaction gives almost quantitative yields of 4-chloro-17α-hydroxy-21-bromopregnane-3,11,20-trione as the solid residue; melting point 168 to 174 degrees centigrade.

*Analysis.*—Calculated for $C_{21}H_{28}ClBrO_4$: Total halogen, 25.10. Found: Total halogen, 24.82.

The 4-chloro-17α-hydroxy-21-bromopregnane-3,11,20-trione is converted to cortisone acetate as shown in Example 4.

*Example 6.—4,21-dichloro-17α-hydroxypregnane-3,11,20-trione*

Treatment of 3α,17α-dihydroxypregnane-11,20-dione [Sarett, J. Am. Chem. Soc., 70, 1454 (1948)] with chlorine in acetic acid gives 3α,17α-dihydroxy-21-chloropregnane-11,20-dione which on treatment with N-chloroacetamide in the presence of anhydrous tertiary-butanol gives 17α-hydroxy-21-chloropregnane-3,11,20-trione.

17α-hydroxy-21-chloropregnane-3,11,20-trione is converted to 4-chloro-17α-hydroxy-21-chloropregnane-3,11,20-trione in the same manner as the corresponding 21-bromo compound of Example 5. Dehydrohalogenation followed by treatment with potassium acetate gives cortisone acetate in the same manner as 4-chloro-17α-hydroxy-21-bromopregnane-3,11,20-trione is converted to cortisone acetate as shown in Example 4.

*Example 7.—4-chloro-11α-hydroxypregnane-3,20-dione*

11α-hydroxyprogesterone [Peterson and Murray, J. Am. Chem. Soc., 74, 1871 (1952)] is reduced with hydrogen at one to two atmospheres absolute pressure using a thirty per cent palladium-charcoal catalyst in the presence of ethanol and a trace of triethylamine to produce 11α-hydroxypregnane-3,20-dione; melting point 85–90 degrees centigrade.

Chlorination of 11α-hydroxypregnane-3,20-dione with tertiary-butyl hypochlorite according to the procedure of Example 3 gives 4-chloro-11α-hydroxypregnane-3,20-dione. Dehydrohalogenation of 4-chloro-11α-hydroxypregnane-3,20-dione using pyridine gives product identical with known 11α-hydroxyprogesterone.

Following the same procedure 11β-hydroxyprogesterone [Reichstein and Fuchs, Helv. Chim. Acta, 24, 351 (1941)], melting at 180–185 degrees centigrade is converted to 11β-hydroxypregnane-3,20-dione which on chlorination using 2.5 molar equivalents of tertiary-butyl hypochlorite yields 4-chloropregnane-3,11,20-trione. Dehydrohalogenation of 4-chloropregnane-3,11,20-trione with collidine yields 4-pregnene-3,11,20-trione.

*Example 8.—4-chloro-11 α-acetoxypregnane-3,20-dione*

11α-hydroxyprogesterone is esterified with acetic anhydride using pyridine as the solvent to obtain 11α-acetoxyprogesterone melting at 175–177 degrees centigrade, which on reduction with hydrogen using a palladium-charcoal catalyst as in Example 7 gives 11α-acetoxypregnane-3,20-dione.

11α-acetoxypregnane-3,20-dione is treated with tertiary-butyl hypochlorite according to the procedure of Example 1 to obtain 4-chloro-11α-acetoxypregnane-3,20-dione which on dehydrohalogenation yields 11α-acetoxyprogesterone melting at 174–177 degrees centigrade, and subsequent hydrolysis with sodium hydroxide in methanol yields 11α-hydroxyprogesterone; melting point 166–167 degrees centigrade.

Following the above procedure other 11α-acyloxyprogesterones are prepared from 11α-hydroxyprogesterone, reduced to 11α-acyloxypregnane-3,20-diones, and chlorinated with an organic hypochlorite to obtain 4-chloro-11α-acyloxypregnane-3,20-diones. The 4-chloro-11α-acyloxypregnane-3,20-diones produced include 4-chloro-11α-formyloxypregnane-3,20-dione; 4-chloro-11α-propionoxypregnane-3,20-dione; 4-chloro-11α-hexanoyloxypregnane-3,20-dione; 4-chloro-11α-benzoyloxypregnane-3,20-dione; 4-chloro-11α-octanoyloxypregnane-3,20-dione; and the like.

*Example 9.—4-chloropregnane-3,20-dione*

One gram of pregnane-3,20-dione is dissolved in fifty milliliters of tertiary-butyl alcohol and to the resulting solution is added 1.5 milliliters of water, 0.429 milliliter of tertiary-butyl hypochlorite, and 0.45 milliliter of concentrated hydrochloric acid with stirring. After about two hours the reaction is complete as determined by iodometric titration of an aliquot sample and the product begins to precipitate from solution. After precipitation is complete, the 4-chloropregnane-3,20-dione is removed by filtration; weight 0.40 gram; melting point 178–183 degrees centigrade. Dilution of the filtrate with water provides a second crop of crystals; weight about 0.53 gram. The total yield is about 90 per cent of the theoretical amount.

In the same manner as shown in Example 1 through Example 9, other α-chloroketosteroids are prepared from the appropriate starting ketosteroid using tertiary-butyl, tertiary-amyl, or other organic hypochlorite such as, for example, propyl, hexyl, octyl, or the like hypochlorite. Steroids thus-produced, which may be dehydrohalogenated as shown in the above examples to give Δ⁴-3-ketosteroids, include the following: 4-chloro-11α,17α-dihydroxypregnane-3,20-dione (from 11α,17α-dihydroxypregnane-3,20-dione), melting point 183 to 185 degrees centigrade, which on mild oxidation with chromic acid in acetic acid yields 4-chloro-17α-hydroxypregnane-3,11,20-trione identical with the product of Example 3; 2-chlorocholestan-3-one melting at 115–130 degrees centigrade by the chlorination of cholestan-3-one; 4-chlorocoprostan-3-one from coprostan-3-one; 4-chloro-17α-hydroxy-21-bromopregnane-3,20-dione (from 17α-hydroxy-21-bromopregnane-3,20-dione) which on dehydrohalogenation followed by treatment with potassium acetate gives the physiologically active 17α-hydroxydesoxycorticosterone 21-acetate; 4-chloro-21-acetoxypregnane-3,11,20-trione (from 21-acetoxypregnane-3,11,20-trione) which on dehydrohalogenation yields the physiologically active 11-dehydrocorticosterone acetate; 4 - chloro - 11α - acetoxy - 17α - hydroxypregnane - 3,20-dione, melting point 232 to 234 degrees centigrade; 4 - chloro - 11α - octanoyloxy - 17α - hydroxypregnane-3,20-dione; 4-chloro-21-bromo-11α,17α-dihydroxypregnane-3,20-dione; 4-chloro-21-bromo-11α-acetoxy-17α-hydroxypregnane-3,20-dione; 4,21-dichloro-11α,17α-dihydroxypregnane-3,20-dione; 4-chloro-21-acetoxy-11α,17α-dihydroxypregnane-3,20-dione; 4 - chloro - 11α,21-diacetoxy - 17α - hydroxypregnane - 3,20 - dione; 4 - chloro-11α - formyloxy - 17α - hydroxy - 21 - acetoxypregnane-3,20-dione; and the like.

It is to be understood that the invention is not to be limited to the exact details of operation or exact compounds shown and described as obvious modifications and equivalents will be apparent to one skilled in the art and the invention is therefore to be limited only by the scope of the appended claims.

We claim:

1. A process for the α-chlorination of a ketosteroid which comprises: contacting a saturated 3-ketosteroid with an organic hypochlorite to introduce a chlorine atom in α-position to the keto group.

2. A process for the α-chlorination of a ketosteroid which comprises: contacting a saturated 3-ketosteroid with an alkyl hypochlorite to introduce a chlorine atom in α-position to the keto group.

3. A process for the α-chlorination of a ketosteroid which comprises: contacting a saturated 3-ketosteroid with an organic hypochlorite in the presence of water.

4. A process for the α-chlorination of a ketosteroid which comprises: contacting a saturated 3-ketosteroid with an alkyl hypochlorite in the presence of water.

5. A process for the α-chlorination of a ketosteroid which comprises: contacting a saturated 3-ketosteroid which is unsubstituted at the 4-position and which has the normal stereoconfiguration at the 5-carbon atom with an alkyl hypochlorite to produce a 4-chloro-3-ketosteroid.

6. A process for the α-chlorination of a ketosteroid which comprises: contacting a saturated 3-ketosteroid which is unsubstituted at the 4-position and which has the normal stereoconfiguration at the 5-carbon atom with an alkyl hypochlorite containing more than one carbon atom in the presence of an organic solvent and in the presence of water at a temperature between about minus ten and about plus fifty degrees centigrade to produce a 4-chloro-3-ketosteroid.

7. A process for the α-chlorination of a ketosteroid which comprises: contacting a saturated 3-ketosteroid containing no primary or secondary-hydroxy groups and which is unsubstituted at the 4-position with an alkyl hypochlorite containing more than one carbon atom in the presence of an organic solvent at a temperature between about minus ten and about plus fifty degrees centigrade to introduce a chlorine atom in α-position to the 3-keto group.

8. A process for the α-chlorination of a ketosteroid which comprises: contacting a saturated 3-keto-11α-hydroxysteroid containing no primary or other secondary-hydroxy groups and which is unsubstituted at the 4-position and has the normal configuration at the 5-carbon atom with an alkyl hypochlorite containing more than one carbon atom in the presence of an organic solvent and in the presence of water at a temperature between about minus ten and about plus fifty degrees centigrade to produce a 4-chloro-3-ketosteroid.

9. A process for the α-chlorination of a ketosteroid which comprises: contacting a saturated 3-keto-11β-hydroxysteroid containing no primary or other secondary-hydroxy groups and which is unsubstituted at the 4-position and has the normal configuration at the 5-carbon atom with an alkyl hypochlorite containing more than one carbon atom in the presence of an organic solvent and in the presence of water at a temperature between about minus ten and about plus fifty degrees centigrade to produce a 4-chloro-3-ketosteroid.

10. A process for the α-chlorination of a ketosteroid which comprises: contacting a saturated 3,11-diketosteroid containing no primary or secondary-hydroxy groups and which is unsubstituted at the 4-position and has the normal configuration at the 5-carbon atom with an alkyl hypochlorite containing more than one carbon atom in the presence of an organic solvent and in the presence of water at a temperature between about minus ten and about plus fifty degrees centigrade to produce a 4-chloro-3-ketosteroid.

11. A process for the α-chlorination of a ketosteroid which comprises: contacting a saturated 3,11-diketosteroid containing no primary or secondary-hydroxy groups and which is unsubstituted at the 4-position, with at least about one molar equivalent of a tertiary-alkyl hypochlorite in the presence of an organic solvent and an acid and in the presence of water in amount up to about twenty per cent of the reaction mixture by weight at a temperature between about minus ten and about plus fifty degrees centigrade to introduce a chlorine atom in α-position to the 3-keto group.

12. A process for the α-chlorination of a ketosteroid which comprises: contacting a saturated 3-keto-11α-hydroxysteroid containing no primary or other secondary-hydroxy groups and which is unsubstituted at the 4-position with at least about one molar equivalent of a tertiary-alkyl hypochlorite in the presence of an organic solvent and an acid and in the presence of water in amount up to about twenty per cent of the reaction mixture by weight at a temperature between about minus ten and about plus fifty degrees centigrade to introduce a chlorine atom in α-position to the keto group.

13. A process for the α-chlorination of a ketosteroid which comprises: contacting a saturated 3-keto-11β-hydroxysteroid containing no primary or other secondary-hydroxy groups and which is unsubstituted at the 4-position, with at least about two molar equivalents of a tertiary-alkyl hypochlorite in the presence of an organic solvent and an acid and in the presence of water in amount up to about twenty per cent of the reaction mixture by weight at a temperature between about minus ten and about plus fifty degrees centigrade to introduce a chlorine atom in α-position to the keto group.

14. A process for the α-chlorination of a ketosteroid which comprises: contacting 17α-hydroxypregnane-3,11,20-trione with between about 1.2 and about 1.5 molar equivalents of tertiary-butyl hypochlorite in the presence of tertiary-butyl alcohol and between about 0.5 and about five molar equivalents of hydrogen chloride and in the presence of water in amount up to about twenty per cent of the reaction mixture by weight at a temperature between about twenty and about thirty degrees centigrade to produce 4-chloro-17α-hydroxypregnane-3,11,20-trione.

15. A process for the α-chlorination of a ketosteroid which comprises: contacting 17α-hydroxy-21-bromopregnane-3,11,20-trione with between about 1.2 and about 1.5 molar equivalents of tertiary-butyl hypochlorite, in the presence of tertiary-butyl alcohol and between about 0.5 and about five molar equivalents of hydrogen chloride and in the presence of water in amount up to about twenty per cent of the reaction mixture by weight at a temperature between about twenty and about thirty degrees centigrade to produce 4-chloro-17α-hydroxy-21-bromopregnane-3,11,20-trione.

16. A process for the α-chlorination of a ketosteroid which comprises: contacting a 17α-hydroxy-21-acyloxy-pregnane-3,11,20-trione with at least about one molar equivalent of tertiary-butyl hypochlorite in the presence of an organic solvent and an acid and in the presence of water in amount up to about twenty per cent of the reaction mixture by weight at a temperature between about twenty and about thirty degrees centigrade to produce a 4-chloro-3-ketosteroid.

17. A process for the α-chlorination of a ketosteroid which comprises: contacting 17α-hydroxy-21-acetoxy-pregnane-3,11,20-trione with between about 1.2 and about 1.5 molar equivalents of tertiary-butyl hypochlorite in the presence of tertiary-butyl alcohol and between about 0.5 and about five molar equivalents of hydrogen chloride and in the presence of water in amount up to about twenty per cent of the reaction mixture by weight at a temperature between about twenty and about thirty degrees centigrade to produce 4-chloro-17α-hydroxy-21-acetoxypregnane-3,11,20-trione.

18. A process for the α-chlorination of a ketosteroid which comprises: contacting 11α-hydroxypregnane-3,20-dione with between about 1.2 and about 1.5 molar equivalents of tertiary-butyl hypochlorite in the presence of tertiary-butyl alcohol and between about 0.5 and about five molar equivalents of hydrogen chloride and in the presence of water in amount up to about twenty per cent of the reaction mixture by weight at a temperature between about twenty and about thirty degrees centigrade to produce 4-chloro-11α-hydroxypregnane-3,20-dione.

19. A process for the α-chlorination of a ketosteroid which comprises: contacting 11β-hydroxypregnane-3,20-dione with between about 2.2 and about 2.5 molar equivalents of tertiary-butyl hypochlorite in the presence of tertiary-butyl alcohol and between about 0.5 and about five molar equivalents of hydrogen chloride and in the presence of water in amount up to about twenty per cent of the reaction mixture by weight at a temperature between about twenty and about thirty degrees centigrade to produce 4-chloropregnane-3,11,20-trione.

20. A process for the α-chlorination of a ketosteroid which comprises: contacting a steroid of the following formula

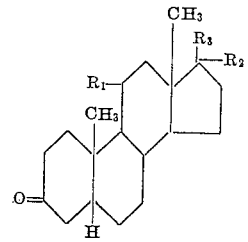

wherein $R_1$ is selected from the group consisting of hydrogen, α-hydroxy, α-acyloxy, β-hydroxy, and ketonic oxygen; $R_2$ is selected from the group consisting of hydrogen and hydroxy; and $R_3$ is selected from the group consisting of acetyl, bromoacetyl, chloroacetyl, and acyloxyacetyl; with at least about one molar equivalent of a tertiary-alkyl hyopchlorite in the presence of an organic solvent and an acid and in the presence of water at a temperature between about minus ten and about plus fifty degrees centigrade to produce a 4-chloro-3-ketosteroid.

References Cited in the file of this patent
UNITED STATES PATENTS 2,403,683  Reichstein _____ July 9, 1946